United States Patent
Araki

(10) Patent No.: US 10,966,267 B2
(45) Date of Patent: Mar. 30, 2021

(54) COMMUNICATION APPARATUS, COMPUTER READABLE STORAGE MEDIUM, AND CONTROL METHOD OF COMMUNICATION USING MULTIPLE MODES AND CHANNEL WIDTHS

(71) Applicant: CANON KABUSHIKI KAISHA, Tokyo (JP)

(72) Inventor: Yuichiro Araki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/678,227

(22) Filed: Nov. 8, 2019

(65) Prior Publication Data
US 2020/0092927 A1 Mar. 19, 2020

Related U.S. Application Data

(63) Continuation of application No. 16/053,847, filed on Aug. 3, 2018, now Pat. No. 10,506,655.

(30) Foreign Application Priority Data

Aug. 10, 2017 (JP) .............................. JP2017-155888

(51) Int. Cl.
*G06F 3/12* (2006.01)
*H04W 76/15* (2018.01)
(Continued)

(52) U.S. Cl.
CPC .......... *H04W 76/15* (2018.02); *G06F 3/1209* (2013.01); *G06F 3/1236* (2013.01);
(Continued)

(58) Field of Classification Search
CPC . H04W 76/14; H04W 76/15; H04W 72/0453; H04W 88/10; H04W 84/12; G06F 3/1209; G06F 3/1236; G06F 3/1292
(Continued)

(56) References Cited

U.S. PATENT DOCUMENTS

2015/0245399 A1 8/2015 Aoki
2016/0094726 A1 3/2016 Abe
(Continued)

FOREIGN PATENT DOCUMENTS

CN 103906194 A 7/2014
EP 2605607 A1 6/2013
(Continued)

OTHER PUBLICATIONS

Japanese Office Action issued in corresponding Japanese Application No. 2017155888 dated Aug. 20, 2018.
(Continued)

*Primary Examiner* — Gabriel I Garcia

(74) *Attorney, Agent, or Firm* — Venable LLP

(57) ABSTRACT

Deterioration of communication is prevented in a communication apparatus, in which an infrastructure mode and a P2P mode are independently and concurrently executable, according to an embodiment of the present invention. Hence, in a case where the communication apparatus is in a state in which a first mode of executing wireless communication with a communication partner apparatus via an external access point and a second mode of executing wireless communication with an external apparatus without using the external access point are concurrently executable, the following selection is made. That is, a first channel width which is not accompanied by network detection processing is selected.

39 Claims, 8 Drawing Sheets

(51) Int. Cl.
    *H04W 36/00*     (2009.01)
    *H04W 76/14*     (2018.01)
    *H04W 72/04*     (2009.01)
    *H04W 88/10*     (2009.01)
    *H04W 84/12*     (2009.01)

(52) U.S. Cl.
    CPC .......... *G06F 3/1292* (2013.01); *H04W 36/03* (2018.08); *H04W 72/0453* (2013.01); *H04W 76/14* (2018.02); *H04W 88/10* (2013.01); *H04W 84/12* (2013.01)

(58) Field of Classification Search
    USPC .......................................... 358/1.1–1.18, 402
    See application file for complete search history.

(56) References Cited

U.S. PATENT DOCUMENTS

| | | | |
|---|---|---|---|
| 2017/0127464 A1* | 5/2017 | Liu | .................. H04W 76/14 |
| 2017/0339132 A1 | 11/2017 | Araki | |
| 2018/0324876 A1 | 11/2018 | Iwami et al. | |

FOREIGN PATENT DOCUMENTS

| | | | |
|---|---|---|---|
| JP | 2015162763 A | 9/2015 |
| JP | 2016149648 A | 8/2016 |
| JP | 2016181922 A | 10/2016 |

OTHER PUBLICATIONS

Chinese Office Action issued in corresponding Chinese Application No. 201810889778.0 dated Jul. 29, 2019.

* cited by examiner

| No. | COMMUNICATION MODE | | CHANNEL WIDTH (MHz) |
|---|---|---|---|
| | INFRASTRUCTURE | P2P | |
| 1 | DISABLE | DISABLE | — |
| 2 | ENABLE | DISABLE | 20/40 |
| 3 | DISABLE | ENABLE | 20 |
| 4 | ENABLE | ENABLE | 20 |

F I G. 11
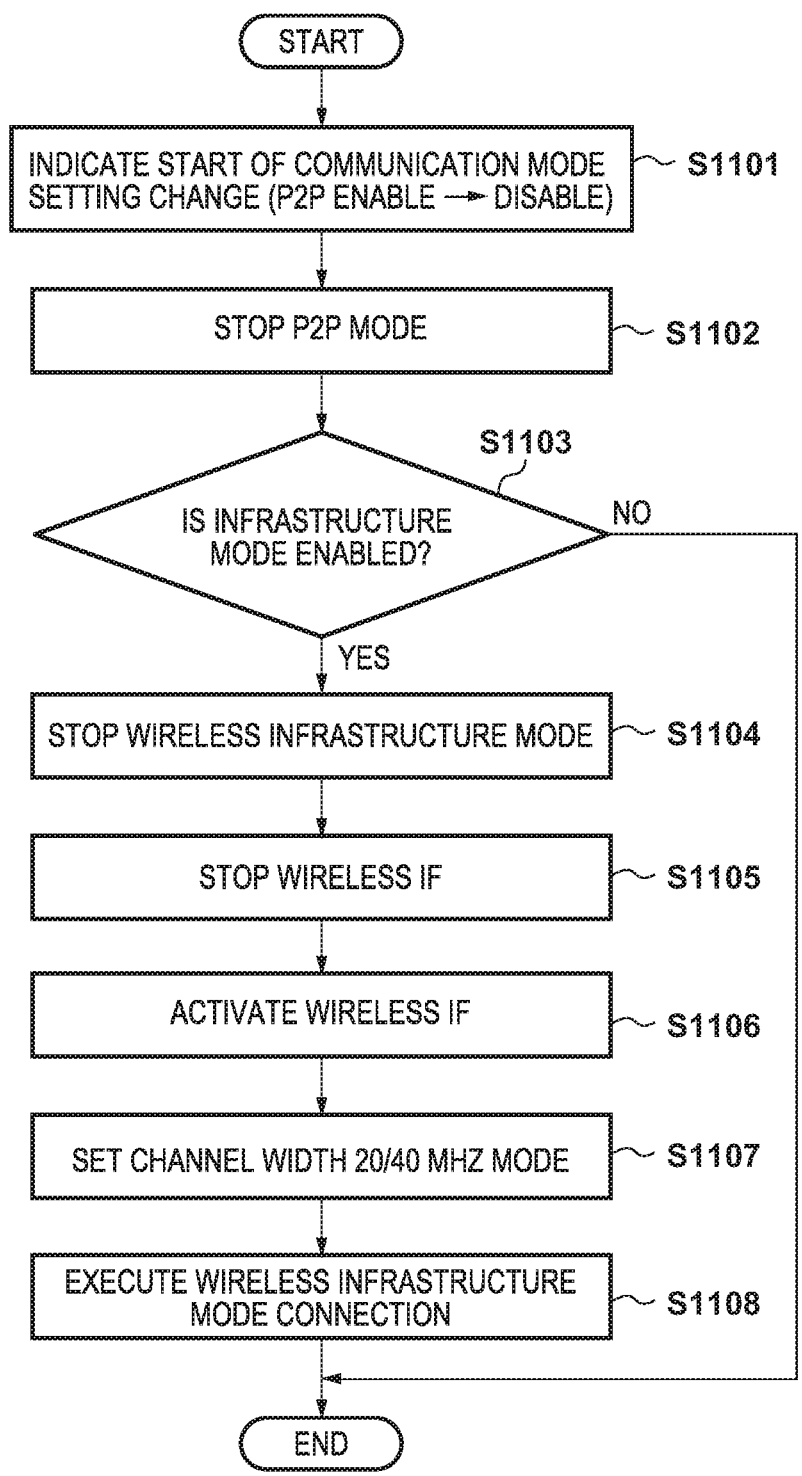

COMMUNICATION APPARATUS, COMPUTER READABLE STORAGE MEDIUM, AND CONTROL METHOD OF COMMUNICATION USING MULTIPLE MODES AND CHANNEL WIDTHS

CROSS-REFERENCE TO RELATED APPLICATIONS

This application is a Continuation of U.S. patent application Ser. No. 16/053,847, filed Aug. 3, 2018, which claims priority to Japanese Patent Application No. 2017-155888, filed Aug. 10, 2017, the entire disclosures of which are both hereby incorporated by reference herein.

BACKGROUND OF THE INVENTION

Field of the Invention

The present invention relates to a communication apparatus, a computer readable storage medium, and a control method of the communication apparatus, and particularly to, for example, a communication apparatus that executes wireless communication in compliance with the IEEE802.11n specification, a computer readable storage medium, and a control method of the communication apparatus.

Description of the Related Art

In recent years, a wireless LAN conforming to the IEEE802.11 specification has been widely used. In a wireless LAN, a base station called an access point (to be referred to as an AP hereinafter) forms a network called a BSS (Basic Service Set), and communication is performed when a station (to be referred to as an STA hereinafter) connects to this network. In recent years, devices conforming to the IEEE802.11n specification which aims to speed up the wireless LAN have become widely used.

In addition to a mode (to be referred to as a 20 MHz mode hereinafter) of operating in a 20 MHz channel width, which is the same channel width as that used the related art, the IEEE802.11n specification optionally supports a mode (to be referred to as a 40 MHz mode hereinafter) of operating in a 40 MHz channel width, which is twice the size of the channel width of the related art. Although the use of a 40 MHz channel width can implement communication with twice the throughput, interference occurs more easily since wireless channels overlap in the 2.4 GHz range and the communication is susceptible to the influence from a neighboring BSS. In addition, when communication is executed in a channel width of 40 MHz, frame collision frequently occurs since the carrier signal from a wireless device which does not conform to the IEEE802.11n specification cannot be detected.

Hence, an OBSS (Overlapping Basic Service Set) scan has been defined in the IEEE802.11n specification. An OBSS scan is performed as follows.

An STA that operates in the 40 MHz mode periodically scans a neighboring network (BSS). If a BSS that does not conform to the IEEE802.11n specification or a BSS that does not permit the 40 MHz mode is detected by the scan, the STA transmits a report to a connection-destination AP. The AP which received the report stops operating in the 40 MHz mode and switches over to a wireless network supporting only the 20 MHz mode. The OBSS scan is implemented in the STA which operates by the 40 MHz mode in the 2.4 GH range.

Japanese Patent Laid-Open No. 2016-149648 discloses a technique for preventing the deterioration of communication quality due to a channel switchover by an OBSS scan.

However, among communication apparatuses that can concurrently execute the infrastructure mode and the P2P mode, there is a communication apparatus that implements an STA function and an AP function by a single wireless chip and a single antenna for the purpose of cost reduction. In this case, since such a communication apparatus cannot concurrently receive a plurality of channels, the frequency band channels and the channel widths to be used in the infrastructure mode and the P2P mode need to be the same.

Furthermore, since the AP function incorporated in the communication apparatus is a simple AP implemented by software, its function and performance are restricted compared to those of a general AP dedicated device. More specifically, the communication apparatus may lack a function that automatically searches for a free channel, a function that dynamically switches over between channel widths, and the like. In such case, AP-side function of the OBSS scan cannot be supported.

On the other hand, the image data size handled by a mobile terminal such as a smartphone is increasing. Hence, a higher speed communication is required when the data of an image captured by the mobile terminal is to be transferred via the wireless LAN and printed by an MFP.

SUMMARY OF THE INVENTION

Accordingly, the present invention is conceived as a response to the above-described disadvantages of the conventional art.

For example, a communication apparatus, a computer readable storage medium, and a control method of the communication apparatus according to this invention are capable of preventing the deterioration of communication quality by selecting an appropriate channel width in accordance with a communication mode setting.

According to one aspect of the present invention, there is provided a communication apparatus that includes a communication unit capable of concurrently executing a first mode which performs wireless communication with a communication partner apparatus via an external access point and a second mode which performs wireless communication with an external apparatus without using the external access point, comprising: a selection unit configured to select a channel width for wireless communication by the communication unit from options which include at least a first channel width and a second channel width in which network detection processing is executed; and a channel width setting unit configured to set a channel width selected by the selection unit, wherein in a case where the first mode and the second mode are concurrently executed by the communication apparatus, the selection unit selects the first channel width, wherein in the second mode, the communication apparatus operates as an apparatus executing a function corresponding to an access point, and wherein a detection result of the network detection processing is transmitted to the external access point.

According to another aspect of the present invention, there is provided a non-transitory computer readable storage medium which stores a computer program to be executed in a processor of a communication apparatus having a communication unit capable of concurrently executing a first mode which performs wireless communication with a communication partner apparatus via an external access point and a second mode which performs wireless communication with an external apparatus without using the external access point, the program comprising: selecting a channel width for wireless communication by the communication unit from options which include at least a first channel width and a second channel width in which network detection processing is executed; and setting the selected channel width to the communication unit, wherein in a case where the first mode and the second more are concurrently executed by the communication apparatus, the first channel width is selected, wherein in the second mode, the communication apparatus operates as an apparatus executing a function corresponding to an access point, and wherein a detection result of the network detection processing is transmitted to the external access point.

According to still another aspect of the present invention, there is provided a control method of a communication apparatus that includes a communication unit capable of concurrently executing a first mode which performs wireless communication with a communication partner apparatus via an external access point and a second mode which performs wireless communication with an external apparatus without using the external access point, the method comprising: selecting a channel width for wireless communication by the communication unit from options which include at least a first channel width and a second channel width in which network detection processing is executed; executing setting processing by using the selected channel width, wherein in a case where the first mode and the second more are concurrently executed by the communication apparatus, the first channel width is selected, wherein in the second mode, the communication apparatus operates as an apparatus executing a function corresponding to an access point, and wherein a detection result of the network detection processing is transmitted to the external access point.

The invention is particularly advantageous since packet losses can be reduced while implementing communication in high speed as much as possible.

Further features of the present invention will become apparent from the following description of exemplary embodiments (with reference to the attached drawings).

BRIEF DESCRIPTION OF THE DRAWINGS

FIG. 11 is a flowchart showing an operation performed when the P2P mode setting is switched over from "disable" to "enable".

DESCRIPTION OF THE EMBODIMENTS

Figure 1:
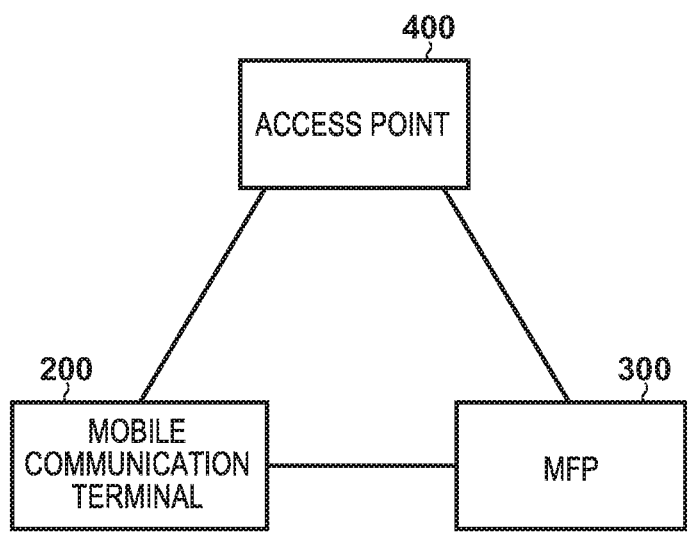
FIG. 1 is a block diagram showing the arrangement of a wireless communication system.

Exemplary embodiments of the present invention will now be described in detail in accordance with the accompanying drawings. Note that the same reference numerals denote already described parts, and a description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "nozzle" generically means an ink orifice or a liquid channel communicating with it, and an element for generating energy used to discharge ink, unless otherwise specified.

The arrangement of a communication system according to an embodiment of the present invention will be described first with reference to FIGS. 1 to 6.

FIG. 1 is a block diagram showing the arrangement of a wireless communication system which includes a mobile communication terminal, a multifunction printer (MFP), and an access point (AP). Note that the MFP will be used as an example of a communication apparatus in this embodiment.

A mobile communication terminal 200 shown in FIG. 1 is an apparatus which includes a wireless LAN (WLAN) communication unit, more specifically, a personal information terminal such as a smartphone, a tablet terminal, a personal computer, a digital camera, or the like. An MFP 300 can execute wireless communication with the mobile communication terminal 200 and has, other than a print function, a reading function (scanner), a FAX function, a telephone function, and the like. An access point (AP) 400 includes a WLAN communication unit and provides a wireless infrastructure mode communication by relaying communication between apparatuses that have permission to connect to the access point.

The mobile communication terminal 200 and the MFP 300 may perform, by their respective WLAN communication units, wireless communication via the AP 400 by a wireless infrastructure mode or may perform P2P communication by Wi-Fi Direct or the like. Note that, as will be described later, the mobile communication terminal 200 and the MFP 300 can execute processing operations corresponding to a plurality of print services via the WLAN.

Figure 2:
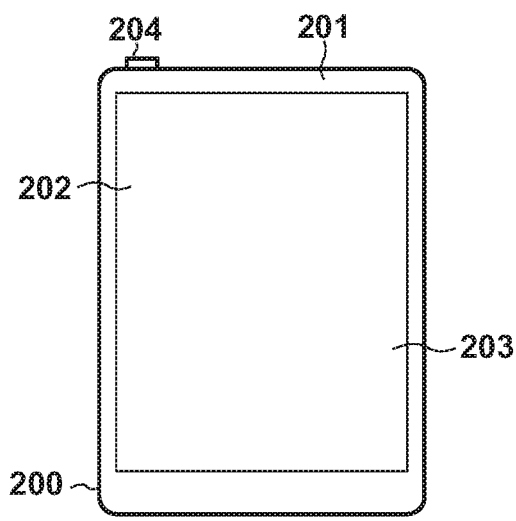
FIG. 2 is a view showing the outer appearance of a mobile communication terminal.

FIG. 2 is a view showing the outer appearance of the mobile communication terminal 200. FIG. 2 exemplifies the outer appearance of a smartphone. A smartphone is a multifunction mobile phone incorporating, other than a telephone function, a camera, a Web browser, an electronic mail function, and the like.

In FIG. 2, the WLAN unit 201 is a unit for executing WLAN communication and can perform, for example, data (packet) communication by a WLAN system conforming to the IEEE802.11n technical specification. Wireless communication using a WLAN unit 201 can implement communication based on Wi-Fi Direct (WFD), communication based on a software AP mode, and communication based on the wireless infrastructure mode. A display unit 202 is a display that includes, for example, an LCD display mechanism. An operation unit 203 includes a touch panel operation mechanism and detects an operation by a user. For example, a representative method is a method of displaying a button icon or a software keyboard by the display unit 202 and detecting an operation event when these parts are touched by the user. A power key 204 is a hard key which is used to turn on or off a power supply.

Figure 3:
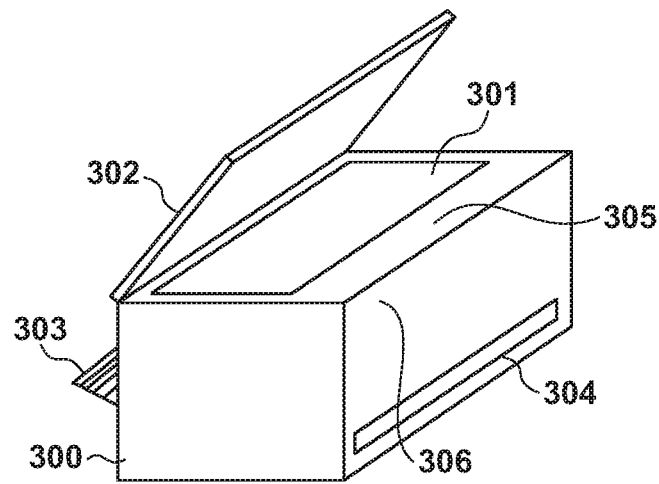
FIG. 3 is a perspective view showing the outer appearance of an MFP.

FIG. 3 is a perspective views showing the outer appearance of the MFP 300.

In FIG. 3, a document table 301 is a clear glass table on which a document that is to be read by a scanner (reading unit) is placed. A document cover 302 is a cover for holding the document when reading is to be performed by the scanner and for preventing the external leakage of the light from a light source that irradiates the document when image reading of the document is performed. An insertion port 303 is an insertion port in which various sizes of print media (for example, print sheets) can be set. Print sheets set on the insertion port 303 are conveyed sheet by sheet to a print unit and discharged from a discharge port 304 after undergoing printing in the print unit. An operation unit 305 is formed from an LED, an LCD, and keys such as character input keys, a cursor key, an enter key, a cancel key, and the like. The operation unit 305 may be formed by a touch panel. A WLAN antenna 306 is an embedded antenna for WLAN communication.

Figure 4A:
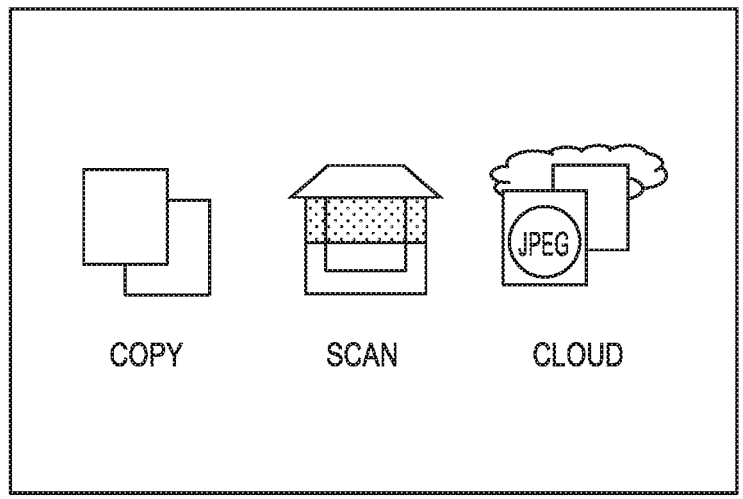
FIGS. 4A, 4B, and 4C are views each showing an example of an operation unit of the MFP.
Figure 4B:
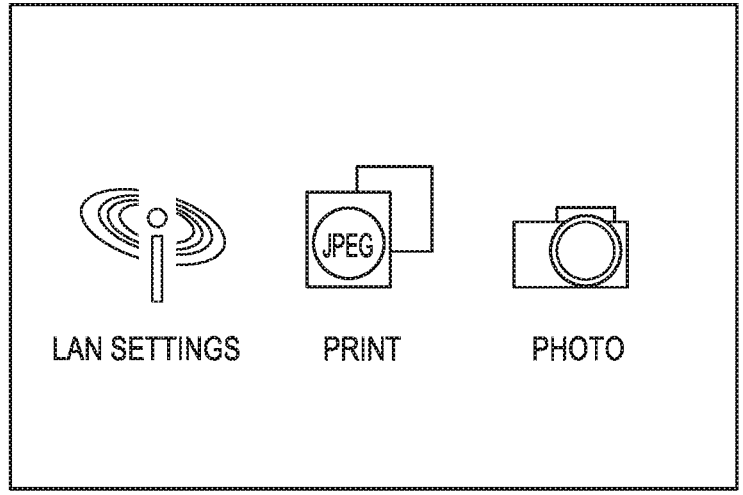
Figure 4C:
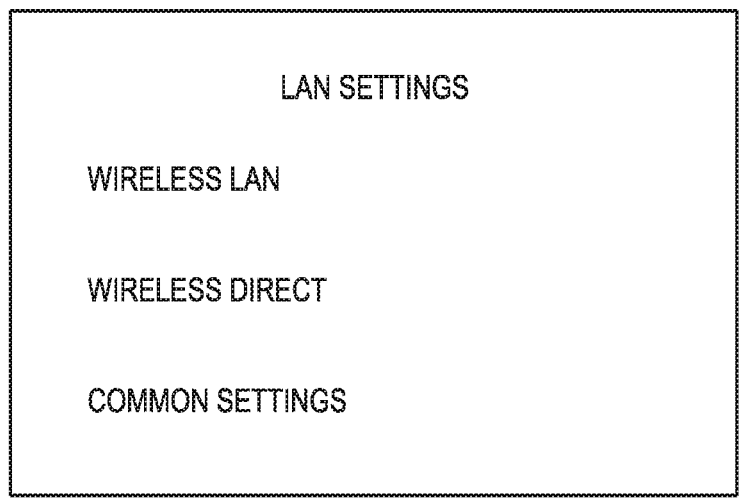

FIGS. 4A to 4C are views each schematically showing an example of a screen display of the operation unit of the MFP.

FIG. 4A is a home screen showing a state (an idle state) in which the MFP 300 is powered on and an operation such as printing or scanning is not performed. Copy, scan, menu display and various settings of cloud functions using Internet communication, and function execution can be made by key operation and touch panel operation from this home screen. A function different from the home screen can be seamlessly displayed by key operation and touch panel operation from the home screen shown in FIG. 4A.

FIG. 4B is an example of a screen different from the home screen, and is a screen from which a print function, a photo function, and changes to the LAN settings can be executed. FIG. 4C is a screen displayed when the LAN settings are selected on the screen shown in FIG. 4B. Changes to various kinds of LAN settings such as an enable/disable setting of the wireless infrastructure mode, an enable/disable setting of the WFD mode, and the like can be executed from this screen.

Figure 5:
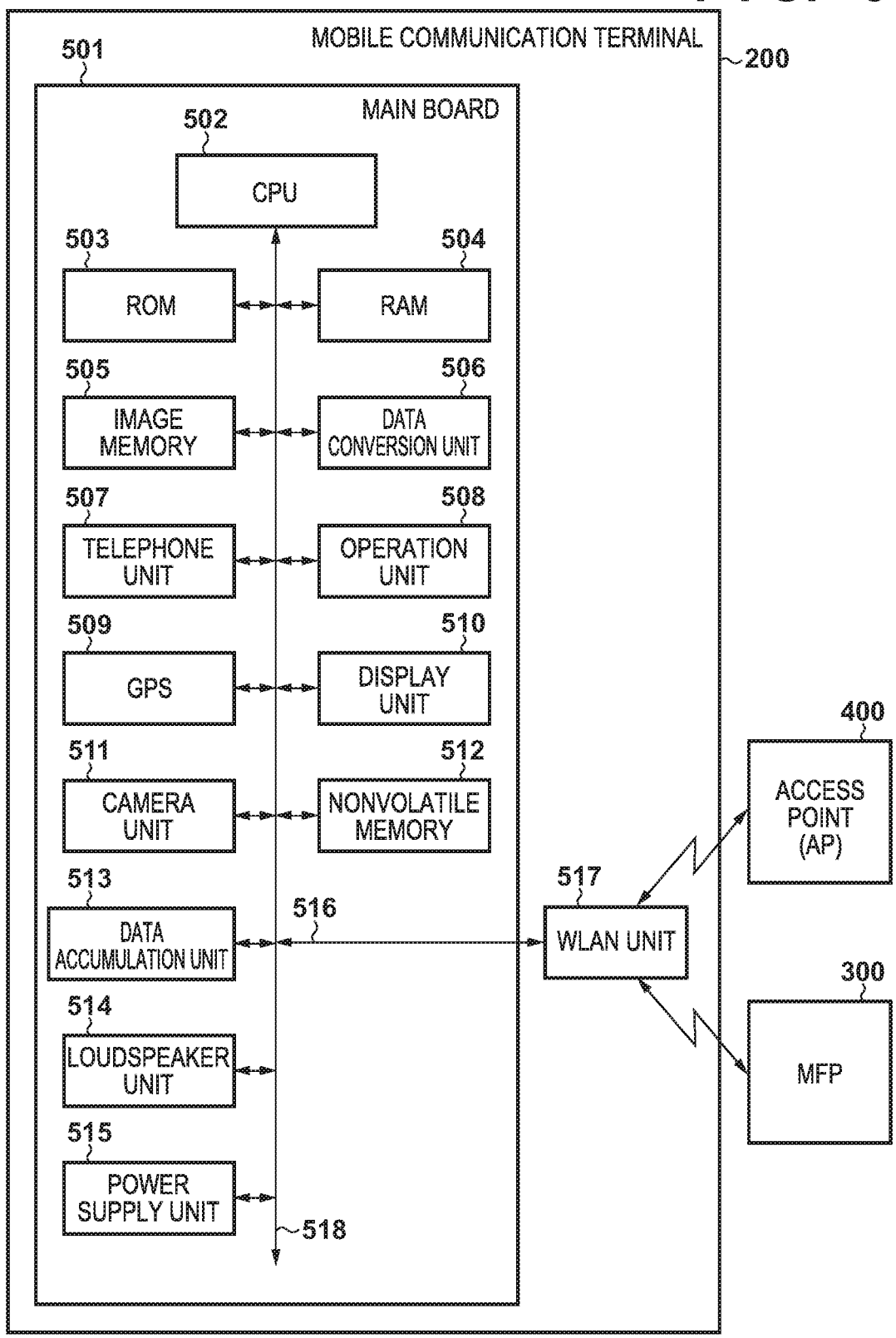
FIG. 5 is a block diagram showing the arrangement of the mobile communication terminal.

FIG. 5 is a block diagram showing the arrangement of the mobile communication terminal. The mobile communication terminal 200 includes a main board 501 that executes the main control of the apparatus itself and a WLAN unit 517 that performs WLAN communication.

In the main board 501, a CPU 502 that serves as a system control unit controls the overall mobile communication terminal 200. The processing operations of the mobile communication terminal 200 to be shown hereinafter are executed under the control of the CPU 502. A ROM 503 stores control programs, an embedded operating system (OS) program, and the like to be executed by the CPU 502. Here, each control program stored in the ROM 503 performs software control such as scheduling, task switching, and the like under the management of the embedded OS stored in the ROM 503.

A RAM 504 is formed from an SRAM or the like, stores data such as program control variable, stores data such as setting values registered by the user and management data of the mobile communication terminal 200, and is allocated with various kinds of work buffer areas. An image memory 505 is formed from a memory such as a DRAM and temporarily stores the image data received via the WLAN unit 517 and the image data read out from a data accumulation unit 513 for processing by the CPU 502.

A nonvolatile memory 512 is formed from a memory such as a flash memory or the like and maintains data even after the power is turned off. Note that the memory arrangement as described above is not limited to this. For example, the image memory 505 and the RAM 504 may be shared and data backup and the like may be performed by the data accumulation unit 513. Also, although a DRAM is used as the image memory 505 here, another computer readable storage medium such as a hard disk, a nonvolatile memory, or the like may be used.

A data conversion unit 506 performs analysis of various formats of data and data conversion such as color conversion and image conversion. A telephone unit 507 controls a telephone line and implements communication by a telephone by processing voice data input/output via a loudspeaker unit 514. An operation unit 508 corresponding to the operation unit 203 controls signals generated by user operation. A GPS (Global Positioning System) 509 obtains position information such as the current latitude and longitude of the mobile communication terminal 200. A display unit 510 electronically controls the contents to be displayed on the display unit 202 and can display various kinds of input operations, the operation status of the MFP 300, statuses, and the like.

A camera unit 511 has a function of electronically recording an image input via a lens and encoding the input image. An image captured by the camera unit 511 is stored in the data accumulation unit 513. The loudspeaker unit 514 implements a voice input or output function for the telephone function and other functions such an alarm notification function. A power supply unit 515 is a portable battery and controls power supply inside the apparatus. As power supply states, there are a dead battery state in which there is no residual amount of power in the battery, a power off state in which the power key 204 has not been pressed, an activation state in which the apparatus has been normally activated, and a power saving state in which the apparatus has been activated but is operating in a power saving mode.

The mobile communication terminal 200 can perform wireless communication by the WLAN. This allows the mobile communication terminal 200 to perform data communication with another device such as the MFP or the like. The WLAN unit 517 converts data into a packet and transmits the packet to the other device. On the other hand, a packet received from an external device is converted into original data, and the converted original data is transmitted to the CPU 502. The WLAN unit 517 is connected to the main board 501 via a bus cable 516. The WLAN unit 517 is a unit for implementing communication that conforms to the IEEE802.11n specification.

The various kinds of components 503 to 515 in the main board 501 and the WLAN unit 517 are connected to each other via a system bus 518 which is managed by the CPU 502.

Figure 6:
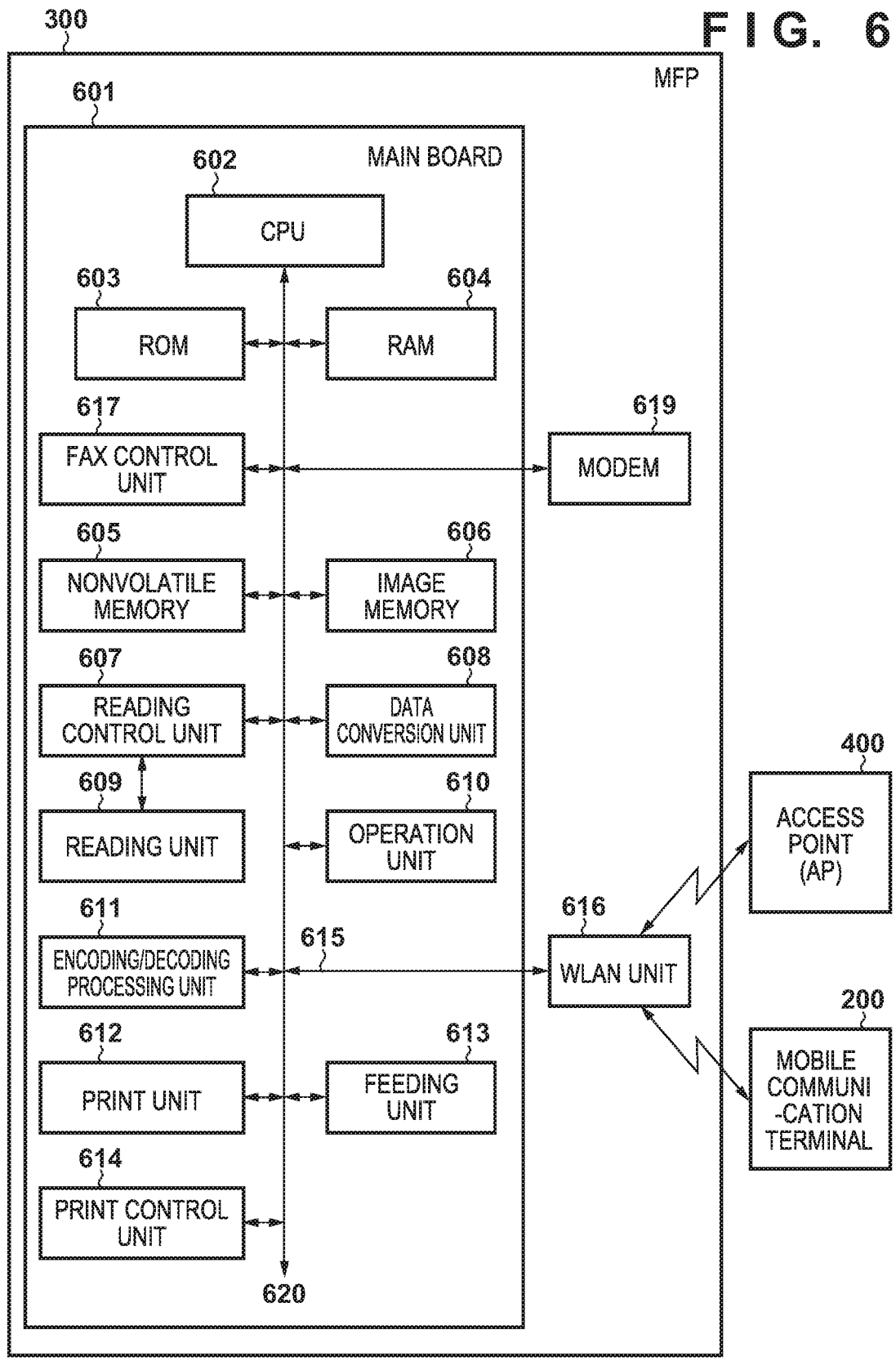
FIG. 6 is a block diagram showing the arrangement of the MFP.

FIG. 6 is a block diagram showing the arrangement of the MFP. The MFP 300 includes a main board 601 that executes the main control of the apparatus itself, a WLAN unit 616 that performs WLAN communication, and a modem 619. The WLAN unit 616 and the modem 619 are kinds of communication units, the WLAN unit 616 supports wireless communication, and the modem 619 supports wired communication.

In the main board 601, a CPU 602 serves as a system control unit and controls the overall MFP 300. The processing operations of the MFP 300 to be shown hereinafter are executed under the control of the CPU 602. A ROM 603 stores control programs, an embedded operating system (OS) program, and the like to be executed by the CPU 602. Here, each control program stored in the ROM 603 performs software control such as scheduling, task switching, and the like under the management of the embedded OS stored in the ROM 603. A RAM 604 is formed from an SRAM or the like, stores data such as program control variables, stores data such as setting values registered by the user and management data of the MFP 300, and is allocated with various kinds of work buffer areas.

A nonvolatile memory 605 is formed from a memory such as a flash memory or the like and maintains data even after the power is turned off. An image memory 606 is formed from a memory such as a DRAM and accumulates the image data received via the WLAN unit 616 and the image data processed by an encoding/decoding processing unit 611. In the same manner as the memory arrangement of the mobile communication terminal 200, the memory arrangement of the MFP is not limited to this. A data conversion unit 608 performs analysis of various formats of data, conversion of image data to print data, and the like.

A reading control unit 607 controls a reading unit 609 (for example, a CIS (contact image sensor)) so as to optically read an image of a document, photoelectrically converts the readout image, and outputs the generated image signal as the image data. At this time, the image data may be output after various kinds of image processing operations such as binary processing and halftoning processing are performed on the image data.

An operation unit 610 corresponds to the operation unit 305 shown in FIGS. 4A to 4C. The encoding/decoding processing unit 611 performs encoding/decoding processing and resizing processing of image data (JPEG, PNG, and the like) handled by the MFP 300. A feeding unit 613 holds print sheets, and the feeding of print sheets can be performed from the feeding unit 613 under the control of a print control unit 614. In particular, the feeding unit 613 may include a plurality of feeding units so that a plurality of types of print sheets may be held in a single MFP. In this case, the print control unit 614 performs control as to which feeding unit is to perform the feeding operation.

The print control unit 614 performs various kinds of image processing operations, such as smoothing processing, print density correction processing, and color correction, on the image data which is to be used for printing, and outputs the processed image data to a print unit 612. The print unit 612 is, for example, an inkjet printer engine that prints an image by discharging ink, which is supplied from an ink tank, from a printhead. The print control unit 614 plays the role of updating the information of the RAM 604 by periodically reading out the information of the print unit 612. More specifically, the print control unit updates the status information such as the residual ink amount of the ink tank and the state of the printhead.

The WLAN unit 616 is a unit that has the same functions as those of the WLAN unit 517 which is incorporated in the mobile communication terminal 200, and the WLAN unit is connected to the main board 601 via a bus cable 615. Note that the mobile communication terminal 200 and the MFP 300 can communicate with each other based on WFD and have a software access point (software AP) function.

A FAX control unit 617 controls the facsimile transmission/reception via the modem 619.

The various kinds of components 602 to 614 and 617 in the main board 601 and the WLAN unit 616 and the modem 619 are connected to each other via a system bus 620 which is managed by the CPU 602.

Communication control executed in the wireless communication system which has the above-described arrangement will be described next with reference to FIGS. 7 to 11.

Figures 7, 8:
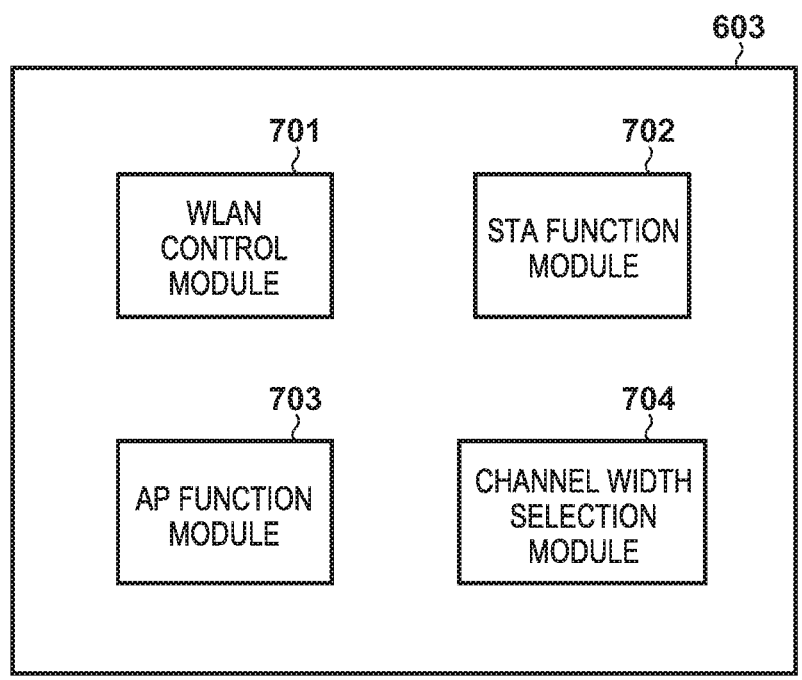
FIG. 7 is a block diagram showing the arrangement of WLAN unit control modules.
FIG. 8 is a table showing the combinations of settable communication modes and channel widths.

FIG. 7 is a block diagram showing the arrangement of modules that are stored in the ROM 603 of the MFP 300 and control the WLAN unit 616.

A WLAN control module 701 is a module that controls the overall WLAN unit 616 and performs the activation and termination of the wireless IF as well as other kinds of control. An STA function module 702 has a function of performing an STA operation conforming to the IEEE802.11n specification when the infrastructure mode has been enabled in the MFP 300. An AP function module 703 has a function of operating as a WFD group owner (GO) and performing an AP operation conforming to the IEEE802.11n specification when the P2P mode has been enabled in the MFP 300. A channel selection module 704 selects whether to operate the WLAN unit 616 in a channel width 20 MHz mode or a channel width 20/40 MHz mode.

Here, the channel width 20 MHz mode is a mode in which communication is performed by fixing the channel width to 20 MHz regardless of the communication partner. The channel width 20/40 MHz mode is a mode in which the channel width is automatically selected to be 20 MHz or 40 MHz depending on the communication partner. That is, it is a mode in which communication is performed by setting a channel width of 40 MHz if the communication partner supports a channel width of 40 MHz which allows high speed communication, and in which communication is performed by setting a channel width of 20 MHz if communication by the channel width of 40 MHz is not supported by the communication partner.

The access point (AP) 400 is arranged so as to connect with a station (STA) that supports only the channel width of 20 MHz by using the channel width of 20 MHz and to connect with an STA that supports a channel width of 40 MHz by using the channel width of 40 MHz. Accordingly, in a case where the MFP 300 selects the channel width 20 MHz mode, the MFP connects to the access point 400 by using the channel width of 20 MHz. On the other hand, in a case where the MFP 300 selects the channel width 20/40 MHz mode, the MFP connects to the access point 400 by using the channel width of 40 MHz. That is, the communication speed obtained when using the channel width of 40 MHz is higher than the communication speed obtained when using the channel width of 20 MHz.

FIG. 8 is a table showing the settable combinations of communication modes and channel widths. In FIG. 8, the leftmost column indicates the setting number, and there are settings 1 to 4 in this embodiment.

Here, a communication mode setting 1 indicates a pattern in which the settings of both the wireless infrastructure mode and the P2P mode are disabled, for example, a LAN disabled setting state in which a network is not used.

A communication mode setting 2 is a pattern in which the setting of the wireless infrastructure mode is enabled and the setting of the P2P mode is disabled. For example, a setup operation with a wireless access point by the wireless infrastructure mode is performed from the LAN disabled setting state, and this wireless setting is stored at the completion of the connection with the wireless access point. In this case, the channel width 20/40 MHz mode is set, and communication is performed by a channel width of 20 MHz or 40 MHz in accordance with the function and the settings on the side of the access point 400.

A communication mode setting 3 is a pattern in which the setting of the wireless infrastructure mode is disabled and the setting of the P2P mode is enabled. For example, when the P2P mode is switched over from the disable setting to the enable setting from the LAN disabled state via the operation unit screen shown in FIG. 4C, the communication mode setting 3 is saved. In this case, the channel width 20 MHz mode is set and the MFP communicates with the P2P-mode-connected mobile communication terminal 200 by using a channel width of 20 MHz.

A communication mode setting 4 is a pattern in which the settings of both the wireless infrastructure mode and the P2P mode are enabled. In this case, the channel width 20 MHz mode is set, and the MFP communicates with access point 400, to which it is connected by the infrastructure mode, and the mobile communication terminal 200, to which it is connected by the P2P mode, by using a channel width of 20 MHz.

The reason for setting the channel width in the manner of FIG. 8 will be described. As described above, an OBSS scan is defined in the IEEE802.11n specification. An STA (the MFP 300 in this embodiment) which operates in the 40 MHz mode periodically executes the OBSS scan. That is, communication that operates in the channel width of 40 MHz is accompanied by a periodical OBSS scan (periodical network detection processing). On the other hand, communication that operates in the channel width of 20 MHz is not accompanied by a periodical OBSS scan (periodical network detection processing).

When the OBSS scan is to be executed, the MFP 300 notifies the access point 400 of a predetermined period of absence. Hence, even when the AP 400 cannot communicate with the MFP 300 for a predetermined period due to the execution of the OBSS scan by the MFP 300, the AP 400 will not erroneously recognize that the wireless connection with the MFP 300 has been disconnected.

From the above reason, in the communication mode setting 2, high speed communication can be executed as much as possible by setting channel width to be 20/40 MHz mode.

On the other hand, while the MFP 300 executes the OBSS scan, communication with a partner apparatus to which the MFP is connected by P2P communication is disabled. Hence, even if the MFP 300 is connected to the AP 400 by the wireless infrastructure mode and is connected to the mobile communication terminal 200 by the P2P mode, the mobile communication terminal 200 cannot transmit data to the MFP 300 during the execution of the OBSS scan by the MFP 300. Hence, a packet loss may occur.

Additionally, when the OBSS scan is to be executed, the MFP 300 cannot notify the mobile communication terminal 200 to which the MFP is connected by the P2P mode of the predetermined period of absence. As a result, the mobile communication terminal 200 may erroneously recognize that the MFP 300 has become absent from the network and may disconnect the P2P connection.

From the above-described reason, since the channel width is fixed to 20 MHz in the communication mode setting 4, the MFP 300 need not execute the OBSS scan, and the occurrence of problems such as the aforementioned packet loss can be reduced.

Note that although the channel width is fixed to 20 MHz for the communication mode setting 3 in this embodiment, the 20/40 MHz mode may also be set.

Figure 9:
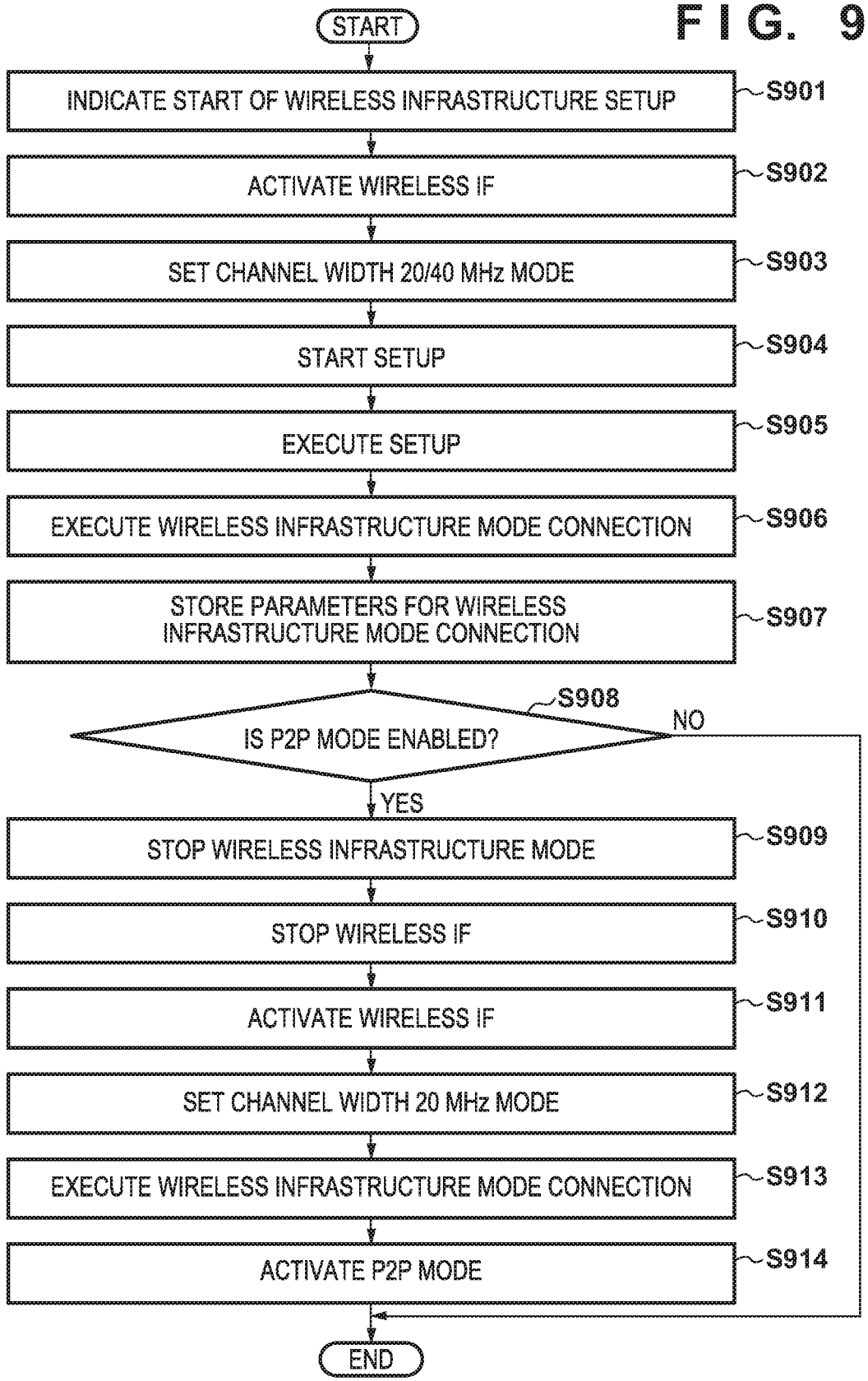
FIG. 9 is a flowchart showing an operation performed when setting up a wireless infrastructure.

FIG. 9 is a flowchart showing the setup operations of the wireless infrastructure mode executed in the MFP. These setup operations are implemented by the CPU 602 reading out a control program stored in the ROM 603, loading the readout control program to the RAM 604, and executing the control program.

First, when the wireless infrastructure setup is operated, in step S901, from the operation unit 305 of the MFP 300, the wireless IF is activated in step S902. In step S903, the channel width 20/40 MHz mode is set for the WLAN unit 616.

Next, in step S904, the MFP 300 starts the setup by presenting setup methods (a push button method and a manual method) on the operation unit 305 to cause the user to select one of the methods. In step S905, the MFP executes the wireless infrastructure setup in accordance with the method selected by the user. Here, if the push button method is selected, the setup is executed when a button of the access point (AP) 400 and a key of the MFP 300 are pressed within a predetermined time and the connection parameters of the AP and the MFP are exchanged. On the other hand, if the manual operation is selected, the MFP executes the wireless infrastructure setup by performing an access point search, selecting a desired access point from a list generated from the search, and inputting a connection parameter such as a passphrase.

When the setup is completed by the above-described operation, a connection is established between the MFP 300 and the access point (AP) 400 in step S906. In step S907, parameters required for infrastructure mode connection are stored in the nonvolatile memory 605.

Subsequently, in step S908, the MFP determines whether the P2P mode has been enabled. As described with reference to FIG. 8, the P2P mode is enabled in the communication mode settings 3 and 4, and the P2P mode is disabled in the communication mode settings 1 and 2.

Here, if the P2P mode has not been enabled, the wireless infrastructure setup is completed intact. On the other hand, if the P2P mode has been enabled, the process advances to step S909 to temporarily stop the wireless infrastructure connection. Furthermore, in step S910, the wireless IF is stopped. In step S911, the wireless IF is reactivated. Subsequently, the setup process advances to step S912.

As described above, the wireless infrastructure connection is temporarily stopped and the wireless IF is reactivated in the processes of steps S909 to S911 because the channel width mode cannot be dynamically changed due to the restrictions to the wireless chip integrated in the MFP 300. That is, since the channel width 20/40 MHz mode has been set in step S903, in order for the infrastructure mode and the P2P mode to be operated concurrently, the channel width 20 MHz mode needs to be set up again after temporarily stopping the wireless IF and performing reactivation.

Note that the present invention is not limited to this. Since the processes of steps S909 to S911 need not be performed if there are no such restrictions to the wireless chip, and the process can advance to step S912 after it is determined in step S908 that the P2P mode is enabled.

The WLAN unit 616 is set, in step S912, to the channel width 20 MHz mode, and a wireless infrastructure mode connection with the access point (AP) 400 is established in step S913. Subsequently, the MFP activates the P2P mode in step S914 and stands by for connection from the mobile communication terminal 200.

When the wireless infrastructure mode is enabled by the above-described setup operation, the MFP connects to the access point by the channel width 20/40 MHz mode if the P2P mode has been disabled, and the MFP connects to the access point and the mobile communication terminal by the channel width 20 MHz mode if the P2P mode is enabled. That is, the CPU 602 selects, in accordance with the communication mode, a channel width for wireless communication from options that include at least a channel width of 20 MHz and a channel width of 40 MHz in which periodical network detection processing is executed. Note that although 20 MHz and 20 MHz/40 MHz have been described as the channel width options in this embodiment, there may be other options.

Figure 10:
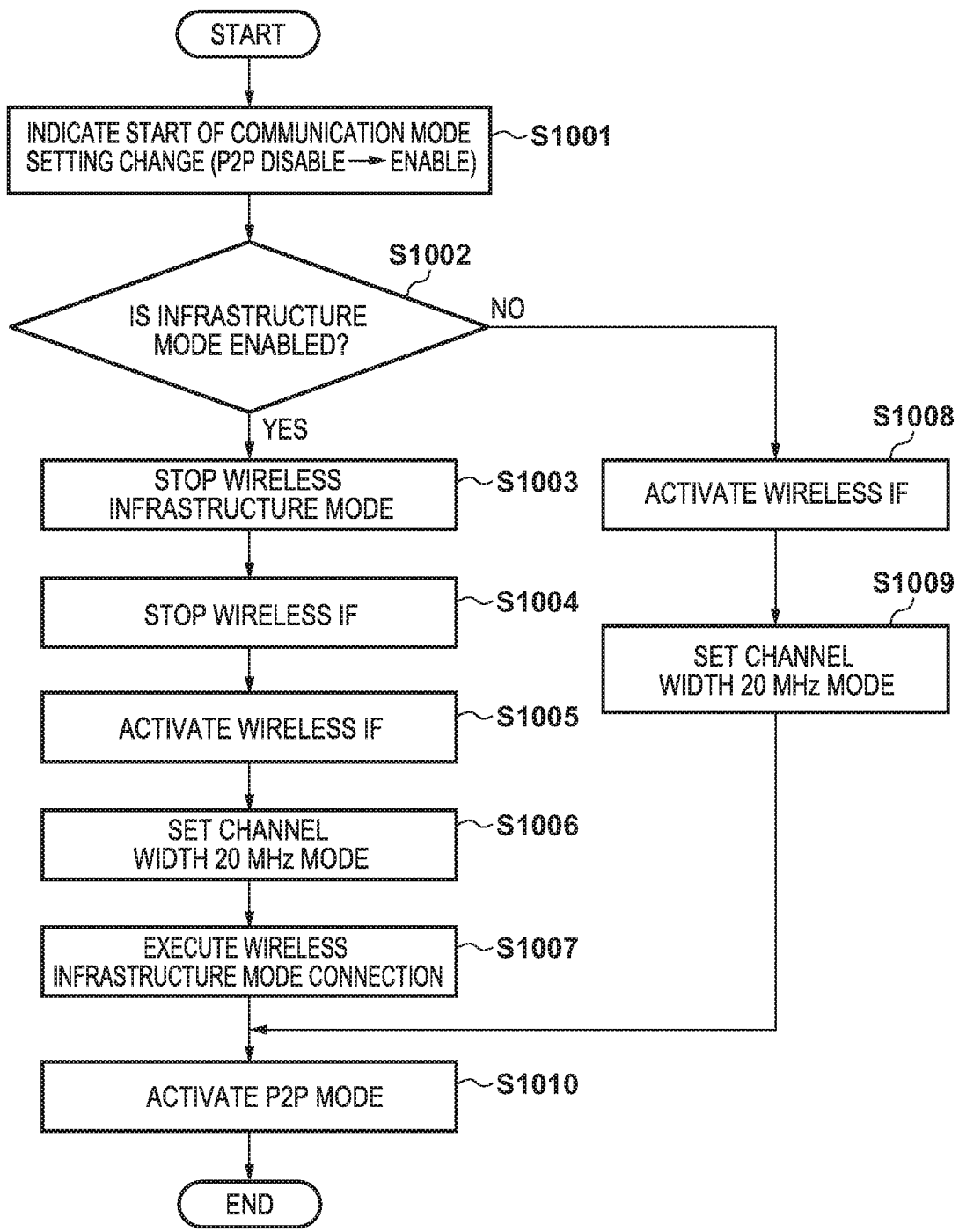
FIG. 10 is a flowchart showing an operation performed when a P2P mode setting is switched over from "enable" to "disable"

FIG. 10 is a flowchart showing the internal operation of the MFP when the setting of the P2P mode is changed from "disable" to "enable". Note that this operation is implemented by the CPU 602 reading out a control program stored in the ROM 603, loading the readout control program to the RAM 604, and executing the control program.

First, when an instruction to switch the P2P mode from the disable setting to the enable setting is executed, in step S1001, from the screen of the operation unit 305 as shown in FIG. 4C, the MFP determines, in step S1002, whether the wireless infrastructure setting is enabled or disabled. Here, since the MFP 300 is in a LAN disabled state if it is determined that the wireless infrastructure mode is disabled, the process advances to step S1008, and the wireless IF is activated. Next, the channel width 20 MHz mode is set in step S1009, and the P2P mode is activated in step S1010. On the other hand, since the channel width needs to be set again if it is determined that the wireless infrastructure mode is enabled, the process advances to step S1003, and the wireless infrastructure mode connection is temporarily stopped. Furthermore, the wireless IF is stopped in step S1004.

Subsequently, the wireless IF is reactivated in step S1005 and the channel width 20 MHz mode is set in step S1006. In step S1007, the wireless infrastructure mode connection is re-established. Next, the P2P mode is activated in step S1010, and the MFP stands by for connection from the mobile communication terminal 200.

The processes of steps S1003 to S1005 are also performed due to the restrictions to the wireless chip in the above described processing procedure, and as described in FIG. 9, the present invention is not limited to this.

In a case where the P2P mode is enabled, the MFP connects to the access point and the mobile communication terminal by using the channel width 20 MHz mode in accordance with the above-described operation.

FIG. 11 is a flowchart showing the internal operation of the MFP when the setting of the P2P mode is changed from "enable" to "disable".

First, when an instruction to switch over the P2P mode from the enable setting to the disable setting is executed, in step S1101, from the screen of the operation unit 305 as shown in FIG. 4C, the operation by the P2P mode is stopped in step S1102. Subsequently, in step S1103, the MFP determines whether the wireless infrastructure mode is enabled.

Since the MFP 300 is in a LAN disabled state if it is determined that the wireless infrastructure mode is disabled, the processing ends. On the other hand, since the channel width needs to be set again if it is determined that the wireless infrastructure mode is enabled, the process advances to step S1104, and the wireless infrastructure mode connection is stopped. Furthermore, the wireless IF is stopped in step S1105.

The wireless IF is reactivated in step S1106, and the channel width 20/40 MHz mode is set in step S1107. Subsequently, the wireless infrastructure mode connection is re-established in step S1108.

The processes of steps S1104 to S1106 are also performed due to the restrictions to the wireless chip in the above described processing procedure, and as described in FIG. 9, the present invention is not limited to this.

In a case where the MFP is to operate by using only the wireless infrastructure mode, the MFP connects to the access point by using the channel width 20/40 MHz mode in accordance with the above procedure.

Hence, according to the above-described embodiment, in a case where operations by both the wireless infrastructure mode and the P2P mode are enabled in the MFP and in a case where the P2P mode is enabled in the MFP, the MFP connects to the access point and the mobile communication terminal by the channel width 20 MHz mode. On the other hand, in a case where the operation of the P2P mode is disabled and only the operation of the wireless infrastructure mode is enabled, the MFP connects to the access point by the channel width 20/40 MHz mode.

Since the MFP can appropriately change the channel width of the wireless communication in accordance with the communication mode in this manner, in a case where the MFP is to operate only by the wireless infrastructure mode, it is possible to execute high speed communication by using a channel width of 40 MHz when the communication partner is an apparatus that supports high speed communication. As a result, in a case where image printing is to be performed by receiving a large amount of image data from a communication partner, data communication can be executed in a short period of time.

Also, the channel width is fixed in a case where the wireless infrastructure mode and the P2P mode are to be simultaneously operated or in a case where only the P2P mode is to be operated. Accordingly, since the channel width will not be switched over during communication, a stable communication without a packet loss caused by a channel switchover can be implemented.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155888, filed Aug. 10, 2017, which is hereby incorporated by reference herein in its entirety.

What is claimed is:

1. A control method implemented by at least one processor of a communication apparatus that includes a communication unit capable of executing a first mode which performs wireless communication with a communication partner apparatus via an external base station and a second mode which performs direct wireless communication with an external apparatus without using an external base station, the method comprising:
    setting a channel width for wireless communication by the communication unit; and
    performing the wireless communication by using the set channel width,
    wherein in a case where both the first mode and the second mode is are enabled, a first channel width is set,
    wherein in a case where the first mode is disabled and the second mode is enabled, the first channel width is set,
    wherein in a case where the first mode is enabled and the second mode is disabled, the channel width is set from options which include at least the first channel width and a second channel width that is different from the first channel width, based on a setting of the external base station,
    wherein in the second mode, the communication apparatus operates as an apparatus executing a function corresponding to a base station, and
    wherein a communication speed of the wireless communication by using the second channel width is faster than that by using the first channel width.

2. The method according to claim 1, wherein each of the first mode and the second mode is enabled or disabled, based on a user's instruction on a screen.

3. The method according to claim 1, wherein the communication unit performs wireless communication in compliance with the IEEE802.11n specification.

4. The method according to claim 1, wherein the first channel width is 20 MHz, and the second channel width is 40 MHz.

5. The method according to claim 1, wherein
the first mode is an infrastructure mode, and
the second mode is a P2P mode.

6. The method according to claim 1, wherein the second mode is a WiFi Direct mode or software AP mode.

7. The method according to claim 1, wherein the communication apparatus has a printing function executing print processing by discharging ink.

8. The method according to claim 1, wherein the external base station is an external access point.

9. The method according to claim 1, wherein in the second mode, the communication apparatus operates as an apparatus executing a function corresponding to a base station to form a network.

10. The method according to claim 9, wherein as the network, a BSS (Basic Service Set) network is formed.

11. The method according to claim 1, wherein in a case where the second channel width is set, network detection processing is executed.

12. The method according to claim 11, wherein the network detection processing is an OBSS (Overlapping Basic Service Set) scan.

13. The method according to claim 11, wherein a predetermined network which does not conform to the IEEE 802.11n specification is detected by the network detection processing.

14. The method according to claim 11, wherein a predetermined network which does not permit 40 MHz channel width is detected by the network detection processing.

15. A communication apparatus that includes a communication unit capable of executing a first mode which performs wireless communication with a communication partner apparatus via an external base station and a second mode which performs direct wireless communication with an external apparatus without using an external base station, comprising:
    a setting unit configured to seta channel width for wireless communication by the communication unit; and
    a processing unit configured to cause the communication unit to perform the wireless communication by using the channel width set by the unit,
    wherein the setting unit and the processing unit are implemented by at least one processor of the communication apparatus,
    wherein in a case where both the first mode and the second mode is are enabled, the setting unit sets the first channel width,
    wherein in a case where the first mode is disabled and the second mode is enabled, the setting unit sets the first channel width,
    wherein in a case where the first mode is enabled and the second mode is disabled, the setting unit sets the channel width from options which include at least the first channel width and a second channel width that is different from the first channel width, based on a setting of the external base station,
    wherein in the second mode, the communication apparatus operates as an apparatus executing a function corresponding to a base station, and
    wherein a communication speed of the wireless communication by using the second channel width is faster than that by using the first channel width.

16. The apparatus according to claim 15, wherein each of the first mode and the second mode is enabled or disabled, based on a user's instruction on a screen.

17. The apparatus according to claim 15, wherein the communication unit performs wireless communication in compliance with the IEEE802.11n specification.

18. The apparatus according to claim 15, wherein the first channel width is 20 MHz, and the second channel width is 40 MHz.

19. The apparatus according to claim 15, wherein
the first mode is an infrastructure mode, and
the second mode is a P2P mode.

20. The apparatus according to claim 15, wherein the second mode is a WiFi Direct mode or software AP mode.

21. The apparatus according to claim 15, wherein the communication apparatus has a printing function executing print processing by discharging ink.

22. The apparatus according to claim 15, wherein the external base station is an external access point.

23. The apparatus according to claim 15, wherein in the second mode, the communication apparatus operates as an apparatus executing a function corresponding to a base station to form a network.

24. The apparatus according to claim 23, wherein as the network, a BSS (Basic Service Set) network is formed.

25. The apparatus according to claim 15, wherein in a case where the setting unit sets the second channel width, network detection processing is executed.

26. The apparatus according to claim 25, wherein the network detection processing is an OBSS (Overlapping Basic Service Set) scan.

27. The apparatus according to claim 25, wherein a predetermined network which does not conform to the IEEE 802.11n specification is detected by the network detection processing.

28. The apparatus according to claim 25, wherein a predetermined network which does not permit 40 MHz channel width is detected by the network detection processing.

29. A control method implemented by at least one processor of a printing apparatus that includes a communication unit capable of executing a first mode which performs wireless communication with a communication partner apparatus via an external base station and a second mode which performs direct wireless communication with an external apparatus without using an external base station, the method comprising:
  setting a channel width for wireless communication by the communication unit; and
  receiving data for printing via the wireless communication by using the set channel width,
  wherein in a case where both the first mode and the second mode are enabled, a first channel width is set,
  wherein in a case where the first mode is enabled and the second mode is disabled, one of the first channel width and the second channel width is set based on a setting of the external base station,
  wherein in the second mode, the printing apparatus operates as an apparatus executing a function corresponding to a base station, and
  wherein the first channel width is 20 MHz and the second channel width is 40 MHz.

30. The method according to claim 29, wherein in a case where the first mode is disabled and the second mode is enabled, the first channel width is set.

31. The method according to claim 29, wherein each of the first mode and the second mode is enabled or disabled, based on a user's instruction on a screen.

32. The method according to claim 29, wherein the communication unit performs wireless communication in compliance with the IEEE802.11n specification.

33. The method according to claim 29, wherein
  the first mode is an infrastructure mode, and
  the second mode is a P2P mode.

34. The method according to claim 29, wherein the second mode is a WiFi Direct mode or software AP mode.

35. The method according to claim 29, wherein the printing apparatus has a printing function executing print processing by discharging ink.

36. The method according to claim 29, wherein in a case where the second channel width is set, network detection processing is executed.

37. The method according to claim 36, wherein a predetermined network which does not conform to the IEEE 802.11n specification is detected by the network detection processing.

38. The method according to claim 36, wherein a predetermined network which does not permit 40 MHz channel width is detected by the network detection processing.

39. The method according to claim 36, wherein the network detection processing is an OBSS (Overlapping Basic Service Set) scan.

* * * * *